United States Patent
Kotecha (10) Patent No.: US 9,936,517 B2
(45) Date of Patent: Apr. 3, 2018

(54) APPLICATION AWARE SCHEDULING IN WIRELESS NETWORKS

(71) Applicant: Verizon Patent and Licensing Inc., Basking Ridge, NJ (US)

(72) Inventor: Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 685 days.

(21) Appl. No.: 14/070,682

(22) Filed: Nov. 4, 2013

(65) Prior Publication Data

US 2015/0124607 A1    May 7, 2015

(51) Int. Cl.
    *H04W 28/02* (2009.01)
    *H04W 72/06* (2009.01)
    *H04W 72/12* (2009.01)
    *H04L 12/823* (2013.01)

(52) U.S. Cl.
    CPC ........ *H04W 72/1242* (2013.01); *H04L 47/32* (2013.01); *H04W 28/0284* (2013.01)

(58) Field of Classification Search
    None
    See application file for complete search history.

(56) References Cited

U.S. PATENT DOCUMENTS

| | | | |
|---|---|---|---|
| 6,950,396 B2 * | 9/2005 | Assa | H04L 47/2425 370/230.1 |
| 2003/0169460 A1 * | 9/2003 | Liao | H04W 28/20 358/426.08 |
| 2007/0140252 A1 * | 6/2007 | Akhtar et al. | 370/395.2 |
| 2007/0268860 A1 * | 11/2007 | Taneja | 370/329 |
| 2008/0188231 A1 * | 8/2008 | Zhu | H04W 72/1252 455/450 |
| 2008/0259852 A1 * | 10/2008 | Massiera | H04L 12/5695 370/329 |
| 2009/0116434 A1 * | 5/2009 | Lohr et al. | 370/329 |
| 2011/0044262 A1 * | 2/2011 | Satapathy et al. | 370/329 |
| 2011/0069666 A1 * | 3/2011 | Kahn | H04W 72/10 370/329 |
| 2011/0320620 A1 * | 12/2011 | Cutler | H04L 41/5029 709/229 |
| 2012/0275428 A1 * | 11/2012 | Feng | H04W 72/042 370/330 |
| 2013/0272121 A1 * | 10/2013 | Stanwood | H04L 47/2475 370/230 |

(Continued)

*Primary Examiner* — Duc T Duong (57) ABSTRACT

Systems and methods disclosed in certain implementations relate to identifying, by a processor, user equipments (UEs) associated with a base station, determining applications associated with the UEs; allocating portions of a bandwidth associated with the base station to the applications; and scheduling transmission of data from the base station based on allocating the portions of the bandwidth to the applications. Scheduling transmission of data from the base may include, for example, determining a particular application associated with the data; determining a particular bandwidth associated with the particular application; determining whether the data can be transmitted from the base station based on the particular bandwidth; and scheduling the data for delivery when the data can be transmitted from the base station based on the particular bandwidth.

20 Claims, 9 Drawing Sheets

(56) References Cited

U.S. PATENT DOCUMENTS

| | | | |
|---|---|---|---|
| 2013/0336132 A1* | 12/2013 | Shaw | H04W 72/08 370/252 |
| 2013/0336229 A1* | 12/2013 | Kakadia | H04W 72/1257 370/329 |
| 2014/0146693 A1* | 5/2014 | Chetlur | H04L 43/103 370/252 |
| 2014/0211698 A1* | 7/2014 | Aguirre et al. | 370/329 |
| 2014/0219082 A1* | 8/2014 | Geijer Lundin | H04L 47/12 370/229 |
| 2014/0226571 A1* | 8/2014 | Das | H04L 41/0896 370/329 |
| 2014/0233479 A1* | 8/2014 | Dahod et al. | 370/329 |
| 2014/0315564 A1* | 10/2014 | Conway | 455/452.1 |
| 2014/0358759 A1* | 12/2014 | Smith et al. | 705/37 |
| 2014/0362698 A1* | 12/2014 | Arad | H04W 16/04 370/235 |
| 2015/0098390 A1* | 4/2015 | Efrati | H04W 28/0215 370/329 |

\* cited by examiner

APPLICATION AWARE SCHEDULING IN WIRELESS NETWORKS

BACKGROUND

Wireless networks deliver different services (e.g., voice over IP (VoIP) content, video content, data retrieval, messaging, etc.) to a mobile device such as a smart phone or a wireless tablet. With improvements in the wireless networks and the wireless devices, bandwidth-intensive applications are being developed in connection with these different application services. The mobile devices may exchange significant amounts of data via the wireless networks in connection with executing these applications. The different applications and services compete for limited air interface and transport network resources of the wireless networks.

DETAILED DESCRIPTION OF PREFERRED EMBODIMENTS

The following detailed description refers to the accompanying drawings. The same reference numbers in different drawings may identify the same or similar elements.

Systems and methods described herein may determine bandwidth allocations transmitted from a wireless base station based on different applications. For example, one certain implementation relates to identifying user equipments (UEs) associated with a base station, determining applications associated with the UEs; allocating portions of a bandwidth associated with the base station to the applications; and scheduling transmission of data from the base station based on allocating the bandwidth to the applications. The scheduling of transmission of data from the base may include, for example: determining a particular application associated with the data; determining a bandwidth associated with the particular application; determining whether the data can be transmitted from the base station based on the bandwidth; and scheduling the data for delivery when the data can be transmitted from the base station using the bandwidth.

As used herein, the terms "subscriber" and/or "user" may be used interchangeably. Also, the terms "subscriber" and/or "user" are intended to be broadly interpreted to include a UE (e.g., a mobile telephone, a smart phone, etc.) or a user of a UE.

Figure 1:
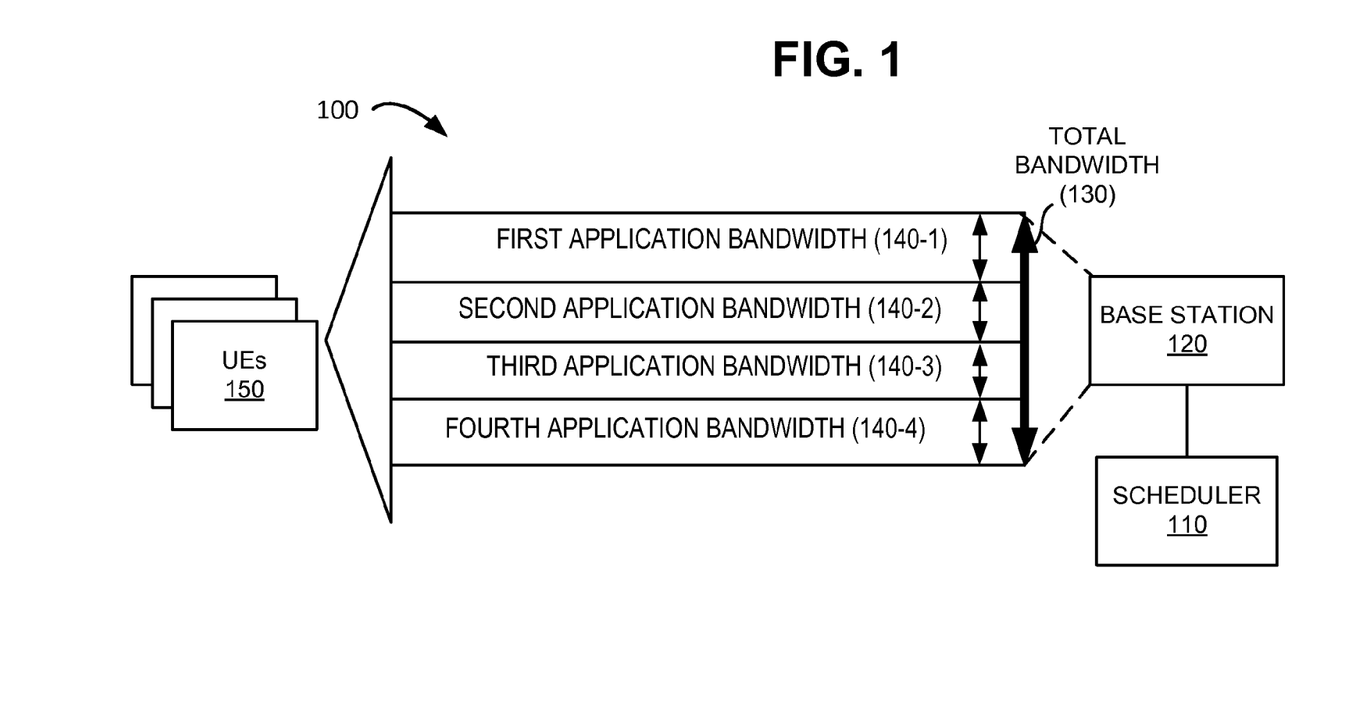
FIG. 1 is a diagram of an exemplary network in which systems and/or methods described herein may be implemented.

FIG. 1 is a diagram of an exemplary network 100 in which systems and methods described herein may be implemented. As illustrated, network 100 may include scheduler 110 that schedules data for transmission from base station 120. More specifically, base station 120 may provide a total bandwidth 130 that includes application bandwidths 140-1, 140-2, 140-3, and 140-4 (collectively referred to herein as "application bandwidths 140," and, in some instances, singularly as "application bandwidth 140") to UEs 150. One scheduler 110, one base station 120, one total bandwidth 130, four application bandwidths 140, and three UEs 150 are illustrated in FIG. 1 for simplicity. In practice, network 100 may include any number of scheduler 110, base station 120, total bandwidth 130, application bandwidth 140, and/or UE 150.

Scheduler 110 may include hardware or a combination of hardware and software to schedule transmissions between base station 120 and UEs 150 over a wireless network. Scheduler 110 may also allocate physical layer (e.g., media access control (MAC) layer) resources to be used transmissions between base station 120 and UEs 150. Scheduler 110 may apply scheduling algorithms which determine what traffic gets sent and/or when the traffic gets sent.

Scheduler 110 may generally be responsible for determining a bandwidth allocation from base station 120 based on applications executed by UEs 150. For example, scheduler 110 may determine applications executed by a particular UE 150 based on a connection request, data requests received, requests for an application, etc., received by base station 120 from the particular UE 150. As shown in FIG. 1, scheduler 110 may allocate portions of total bandwidth 130 provided by base station 120 to client devices 150 as separate applications bandwidths 140.

Base station 120 (also known as an evolved Node-B or eNode-B) may include one or more computation and/or communication devices that provide a wireless access network to wirelessly exchange voice and/or application data transmit with UE 150 using total bandwidth 130. The wireless access network, in one implementation, may correspond to a 4G network, a Long Term Evolution (LTE) network, an advanced LTE network, etc. In another implementation, the wireless access network may include a WiFi network or other access networks (e.g., an enhanced high-rate packet data (eHRPD) network or a WiMax network). In other implementations, the wireless access network may include a wireless network other than an IP wireless access network.

In implementations herein, base station 120 may enforce quality of service (QoS) or other bandwidth constraints due to congestion in the wireless IP access network. For example, base station 120 may receive an initial attach request from UEs 150. Based on the attach requests, scheduler 110 may determine particular quality of service (QoS) values associated with UEs 150, also referred to as QoS Class Indicator (QCI) values. Based on the QCI values associated with UEs 150, total bandwidth 130, and application requirements for applications executed by UEs 150, scheduler 110 may calculate application bandwidths 140. Base station 120 may use the calculated application bandwidths 140 to rate limit traffic (e.g., download rates during periods of network congestion).

UEs 150 may include any device that is capable of communicating with base station 120 via the wireless access network associated with total bandwidth 130. For example, UEs 150 may include a mobile computation and/or communication device, such as a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, UE 150 may include a fixed (e.g., provided in a particular location, such as within a subscriber's home) computation and/or communication device, such as a laptop computer, a personal computer, a tablet computer, a set-top box (STB), a television, a gaming system, etc.

Although FIG. 1 shows exemplary components of network 100, in other implementations, network 100 may include fewer components, different components, differently arranged components, and/or additional components than those depicted in FIG. 1. For example, application bandwidths 140 may be determined by a component that is separate from scheduler 110. Alternatively or additionally, one or more components of network 100 may perform one or more other tasks described as being performed by one or more other components of network 100.

Figure 2:
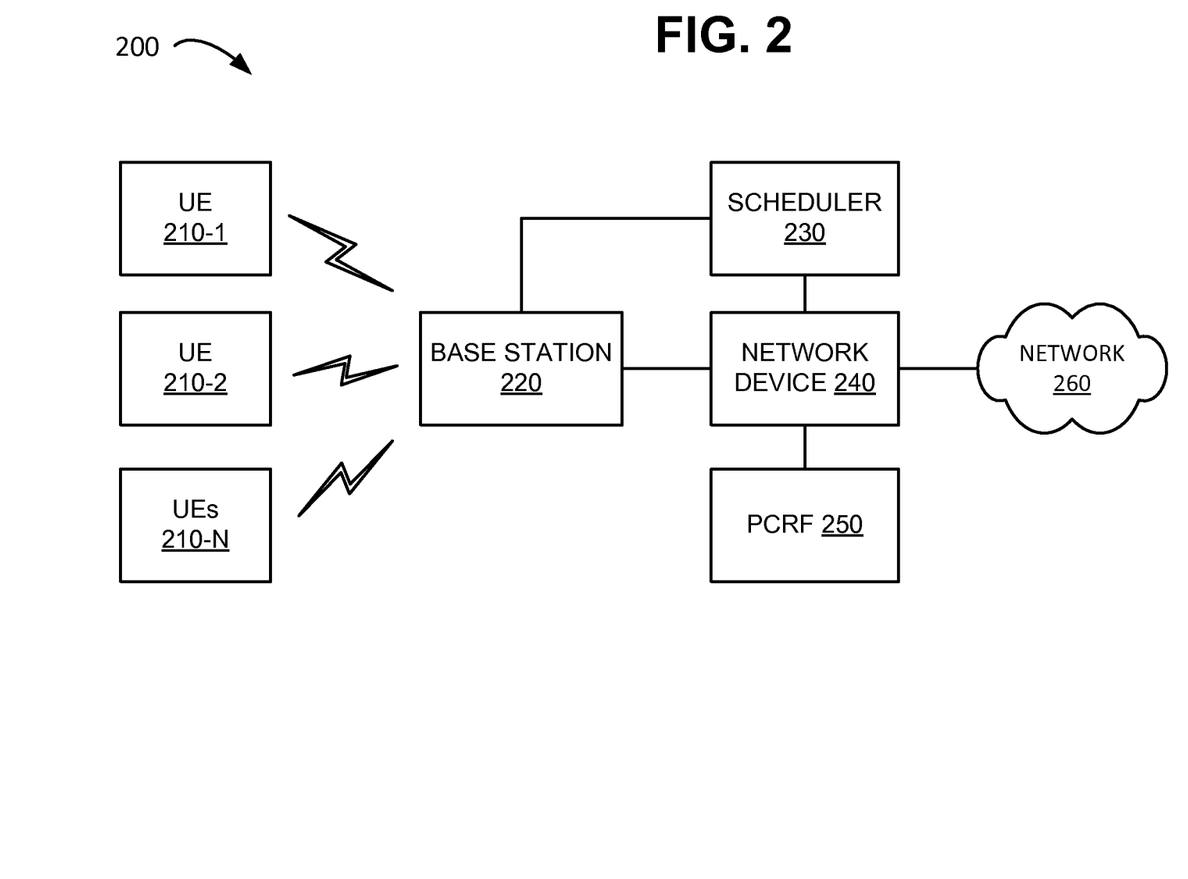
FIG. 2 is a diagram of an exemplary environment for implementing embodiments described herein.

FIG. 2 is a diagram of an exemplary environment 200 for implementing embodiments described herein. Environment 200 may include, for example, three user devices 210-1, 210-2, and 210-N (collectively referred to herein as "user devices 210," and, in some instances, singularly as "user device 210"), a base station 220, a mobility management entity (MME) 230, a network device 240, a policy and charging rules function (PCRF) 250, and a network 260. Components of network 200 may interconnect via wired and/or wireless connections. Three user devices 210, one base station 220, one MME 230, one network device 240, one PCRF 250, and one network 260 have been illustrated in FIG. 2 for simplicity. In practice, there may be more user devices 210, base stations 220, MMEs 230, network devices 240, PCRFs 250, and networks 260.

User device 210 may correspond to a UE 150 and may include any device that is capable of communicating with network 260 via an IP wireless access network (e.g., provided by base station 220, MME 230, and/or network device 240). For example, user device 210 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 210 may include a fixed (e.g., provided in a particular location, such as within a subscriber's home) computation and/or communication device, such as a laptop computer, a personal computer, a tablet computer, a set-top box (STB), a television, a gaming system, etc.

Base station 220 may correspond to base station 120 and may include one or more computation and/or communication devices that receive voice and/or data from MME 230 and/or network device 240 and wirelessly transmit that voice and/or data to user device 210. Base station 220 may also include one or more devices that wirelessly receive voice and/or data from user device 210 and transmit that voice and/or data to one of MME 230, network device 240, and/or other user devices 210. In implementations herein, base station 220 may enforce QoS constraints due to congestion in the wireless IP access network.

MME 230 may include one or more computation and/or communication devices that provide a convergence point between wireless protocols (e.g., associated with user device 210 and/or base station 220) and IP protocols (e.g., associated with PCRF 250 and network 260). MME 230 may be involved in a bearer activation/deactivation process (e.g., for user device 210) and may choose a network device 240 for user device 210 at an initial attachment and/or handover.

Network device 240 may include one or more data transfer devices, such as a mobile gateway, a router, a switch, a firewall, a network interface card (NIC), a hub, a bridge, a proxy server, an optical add-drop multiplexer (OADM), or some other type of device that processes and/or transfers data. In one example, network device 240 may route packets (or portions of packets) from a wireless network (e.g., user device 210 and base station 220) to another network (e.g., network 260).

In one example implementation, network device 240 may receive (e.g., from PCRF 250) a policy configuration (e.g., that includes a bandwidth allocation) associated with user device 210, and may provide the policy configuration to base station 220.

In one example, base station 220, MME 230, and/or network device 240 may provide an all IP wireless access network for user device 210. The IP wireless access network, in one implementation, may correspond to a 4G network, a Long Term Evolution (LTE) network, an advanced LTE network, etc. The LTE network may include a communications network that connects subscribers (e.g., user device 210) to another device (e.g., within network 260). In another implementation, the IP wireless access network may include a WiFi network or other access networks (e.g., an enhanced high-rate packet data (eHRPD) network or a WiMax network). In other implementations, the wireless access network may include a wireless network other than an IP wireless access network.

PCRF 250 may include one or more computation or communication devices that may provide policy control decision and flow based charging control functionalities. PCRF 250 may provide network control regarding service data flow detection, gating, QoS and flow based charging, etc. PCRF 250 may determine how a certain service data flow shall be treated, and may ensure that user plane traffic mapping and treatment is in accordance with a user's subscription profile.

In one example implementation, PCRF 250 may receive (e.g., from a network administrator) a policy configuration for subscribers and/or application services provided by the IP wireless access network (e.g., application data provided by base station 220 and/or network device 240). The subscriber policy configuration may define rate limits associated with the applications and may further define rate limits associated with subscribers of the IP wireless access network. For example, the subscriber policy configuration may include application bandwidths, a QoS level (e.g., a QCI value), a maximum downlink bit rate, and a maximum uplink bit rate associated with a subscriber.

Network 260 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one implementation, network 260 may include an IP core network and/or one or more packet data networks (PDNs).

Although FIG. 2 shows example components of network 200, in other implementations, network 200 may include fewer components, different components, differently arranged components, and/or additional components than those depicted in FIG. 2. Alternatively, or additionally, one or more components of network 200 may perform one or more other tasks described as being performed by one or more other components of network 200.

Figure 3:
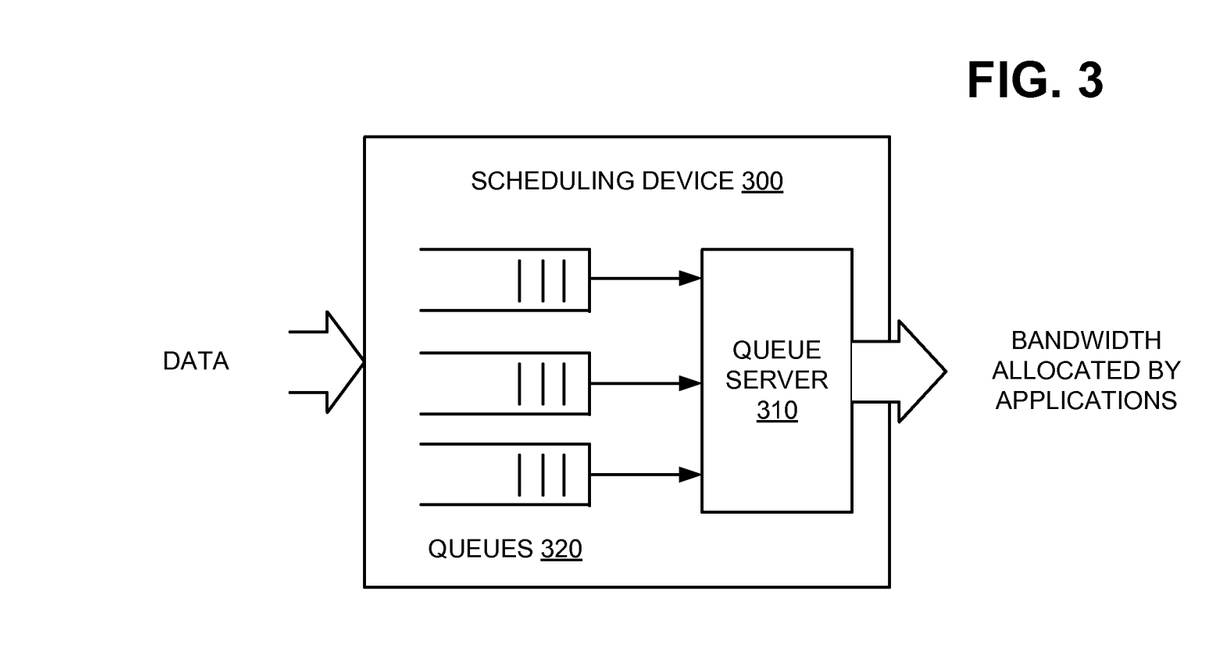
FIG. 3 is a diagram of exemplary components of a scheduling device.

FIG. 3 is a diagram of exemplary components of a scheduling device 300 that may correspond to scheduler 110. As shown in FIG. 3, scheduling device 300 includes queue server 310 and multiple queues 320. Queue server 310 may service queues 320 with traffic associated with UEs 150. Queue 320 may be logically divided into service groups based on, for example, different applications associated with UEs 150. For example, a group of queues 320 may include queues associated with a first application, and a second group of queues 320 may include queues associated with a second application. Other queue groups may be used for additional applications. During periods of congestion, queue server 310 may allocate certain amounts of bandwidth for groups of queues 320 based on the applications.

Instead of allocating equally from each queue within groups of queues 320, queue server 310 may apply a bandwidth weight factor $W_i$ to each active queue within a group of queues 320 associated with a particular application. In one implementation, a particular bandwidth ($BW_i$) may be allocated to an $i^{th}$ application, and the bandwidth weight factor $W_i$ may be determined based on comparing $BW_i$ to a total bandwidth ($BW_{total}$). For example, bandwidth weight factor $W_i$ may be calculated based on the following expression (Expression 1):

$$W_i = \frac{BW_i}{BW_{total}}. \quad \quad \text{Expression (1)}$$

The bandwidth weight factor $W_i$ may be used by queue server 310 to allocate the bandwidth allotted for a particular application so that a total bandwidth provided by base station 120 is allocated among applications associated with UEs 150. For example, queue server 310 may schedule transmission of data at the queue 320 based on the bandwidth weight factor $W_i$. In one implementation, base station 120 may transmit bandwidth weight factor $W_i$ to other base stations 120 so that the bandwidth allocation can be enforced as the UE 150 moves among cells 212.

In another implementation, Wi may be determined based on additional factors. For example, a particular queue 320 may be associated with a particular UE 150, and a bandwidth weight factor may be further based on, for example, a QoS, QCI, or other value associated with the particular UE 150. For example, a bandwidth weight factor $W_{ij}$ may be allocated to an $i^{th}$ application and a $j^{th}$ UE 150. In other words, bandwidth weight factor $W_{ij}$ may be used to schedule data, associated with the $i^{th}$ application, that is being sent to the $j^{th}$ UE 150.

Although FIG. 3 shows example components of scheduling device 300, in other implementations, scheduling device may include fewer components, different components, differently arranged components, or additional components than those depicted in FIG. 3. Additionally or alternatively, one or more components of scheduling device 300 may perform the tasks described as being performed by one or more other components of scheduling device 300.

Figure 4:
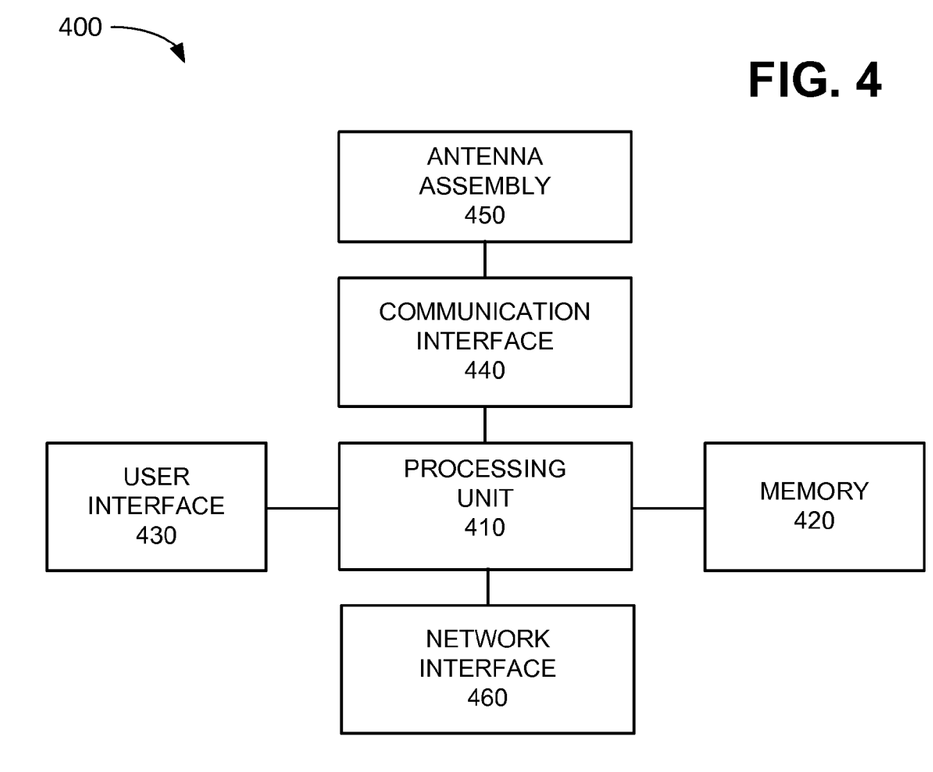
FIG. 4 is a diagram illustrating example components of a base station system.

FIG. 4 is a diagram illustrating example components of a base station system 400 that may correspond to base station 120 according to an implementation described herein. As shown in FIG. 4, base station system 400 may include a processing unit 410, a memory 420, a user interface 430, a communication interface 440, an antenna assembly 450, and a network interface 460.

Processing unit 410 may include one or more processors, microprocessors, application specific integrated circuits (ASICs), field programmable gate arrays (FPGAs), and/or other processing logic. Processing unit 410 may control operation of base station 120 and its components.

Memory 420 may include a random access memory (RAM) or another type of dynamic storage device, a read only memory (ROM) or another type of static storage device, a removable memory card, and/or another type of memory to store data and instructions that may be used by processing unit 410.

User interface 430 may include mechanisms for inputting information to base station 120 and/or for outputting information from base station 120. Examples of input and output mechanisms might include a speaker to receive electrical signals and output audio signals; a microphone to receive audio signals and output electrical signals; buttons (e.g., a joystick, control buttons, a keyboard, or keys of a keypad) and/or a touchscreen to permit data and control commands to be input into base station 120; a display, such as an LCD, to output visual information; and/or any other type of input or output device. In some embodiments, base station 120 may be managed remotely and may not include user interface 430. Thus, base station 120 may be "headless" and may exclude an input device and/or an output device.

Communication interface 440 may include one or more RF transceivers (not shown) that enable base station system 400 to communicate with UEs 150 via wireless communications (e.g., via a wireless access network). An RF transceiver may include both (1) an RF transmitter that receives signals to be transmitted wirelessly and performs signal processing on the signals before providing the signals to antenna assembly 450 and (2) an RF receiver that receives signals from antenna assembly 450 and performs signal processing on the received signals before providing the received signals to processing unit 410. For example, the RF transceiver may perform analog-to-digital and digital-to-analog conversion, modulation and demodulation, up-conversion and down-conversion, and/or amplification of signals.

Antenna assembly 450 may include one or more antennas to transmit and/or receive RF signals over the air. Antenna assembly 450 may, for example, receive RF signals from communication interface 440 and transmit the signals over the air and receive RF signals over the air and provide them to communication interface 440.

Network interface 460 may include a logical component that includes input and/or output ports, input and/or output systems, and/or other input and output components that facilitate the transmission of data to other devices via a backhaul link. For example, network interface 460 may include a network interface card (e.g., Ethernet card) for wired communications and/or a wireless network interface (e.g., a WiFi) card for wireless communications. Network interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described herein, base station system 400 may perform certain operations in response to processing unit 410 executing software instructions contained in a computer-readable medium, such as memory 420. A computer-readable medium may be defined as a non-transitory memory device. A non-transitory memory device may include memory space within a single physical memory device or spread across multiple physical memory devices. The software instructions may be read into memory 420 from another computer-readable medium or from another device via communication interface 440. The software instructions contained in memory 420 may cause processing unit 410 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 4 shows example components of base station system 400, in other implementations, base station system 400 may include fewer components, different components, differently arranged components, or additional components than those depicted in FIG. 4. Additionally or alternatively, one or more components of base station system 400 may perform the tasks described as being performed by one or more other components of base station system 400.

Figure 5:
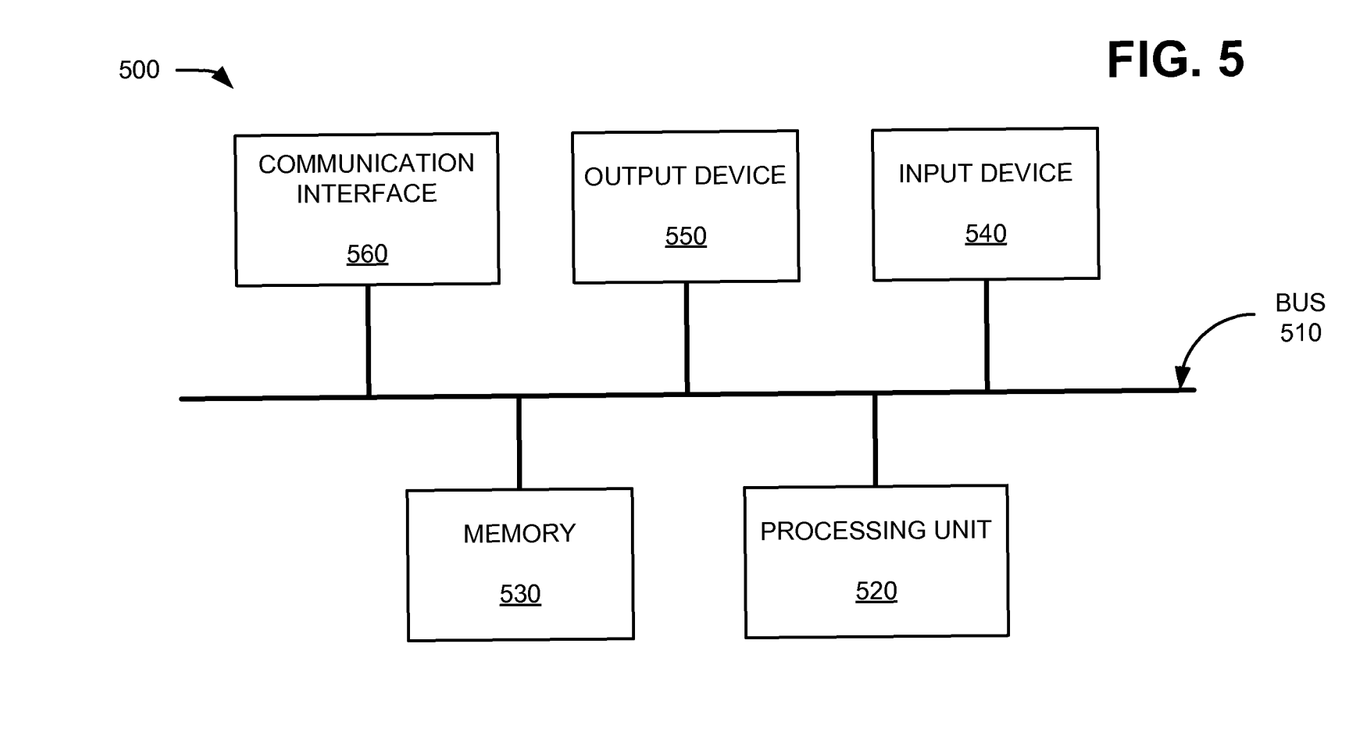
FIG. 5 is a diagram of exemplary components of a device that may be included in the network depicted in FIG. 1, the environment depicted in FIG. 2, the scheduling device depicted in FIG. 3, and/or the base station system depicted in FIG. 4.

FIG. 5 is a diagram of exemplary components of a device 500 in one implementation that may correspond, for example, to UE 140 or correspond to or be included in other components of network 100, environment 200, scheduling device 300, or base station system 400. One or more of components included in device 500 may be implemented and/or installed as software, hardware, or a combination of hardware and software. As shown in FIG. 5, device 500 may include, for example, a bus 510, a processing unit 520, a memory 530, an input device 540, an output device 550, and a communication interface 560.

Bus 510 may permit communication among the components of device 500. Processing unit 520 may include one or more processors or microprocessors that interpret and execute instructions. In other implementations, processing unit 520 may be implemented as, or include, one or more application specific integrated circuits (ASICs), field programmable gate arrays (FPGAs), and/or the like.

Memory 530 may include a random access memory (RAM) or another type of dynamic storage device that stores information and instructions for execution by processing unit 520, a read only memory (ROM), electrical erasable permanent memory (Flash) or another type of static storage device that stores static information and instructions for the processing unit 520, and/or some other type of magnetic or optical recording medium and its corresponding drive for storing information and/or instructions.

Input device 540 may include a device that permits an operator to input information to device 500, such as a keyboard, a keypad, a mouse, a pen, a microphone, one or more biometric mechanisms, and the like. Output device 550 may include a device that outputs information to the operator, such as a display, a speaker, etc.

Communication interface 560 may include a transceiver that enables device 500 to communicate with other devices and/or systems. For example, communication interface 560 may include mechanisms for communicating with other devices, such as other devices of environment 200.

As described herein, device 500 may perform certain operations in response to processing unit 520 executing software instructions contained in a computer-readable medium, such as memory 530. A computer-readable medium may include a tangible, non-transitory memory device. A memory device may include space within a single physical memory device or spread across multiple physical memory devices. The software instructions may be read into memory 530 from another computer-readable medium or from another device via communication interface 560. The software instructions contained in memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows exemplary components of device 500, in other implementations, device 500 may include fewer components, different components, differently arranged components, or additional components than those depicted in FIG. 5. Furthermore, it should be appreciated that tasks described as being performed by two or more other components of device 500 may be performed by a single component, and tasks described as being performed by a single component of device 500 may be performed by two or more components.

Figure 6:
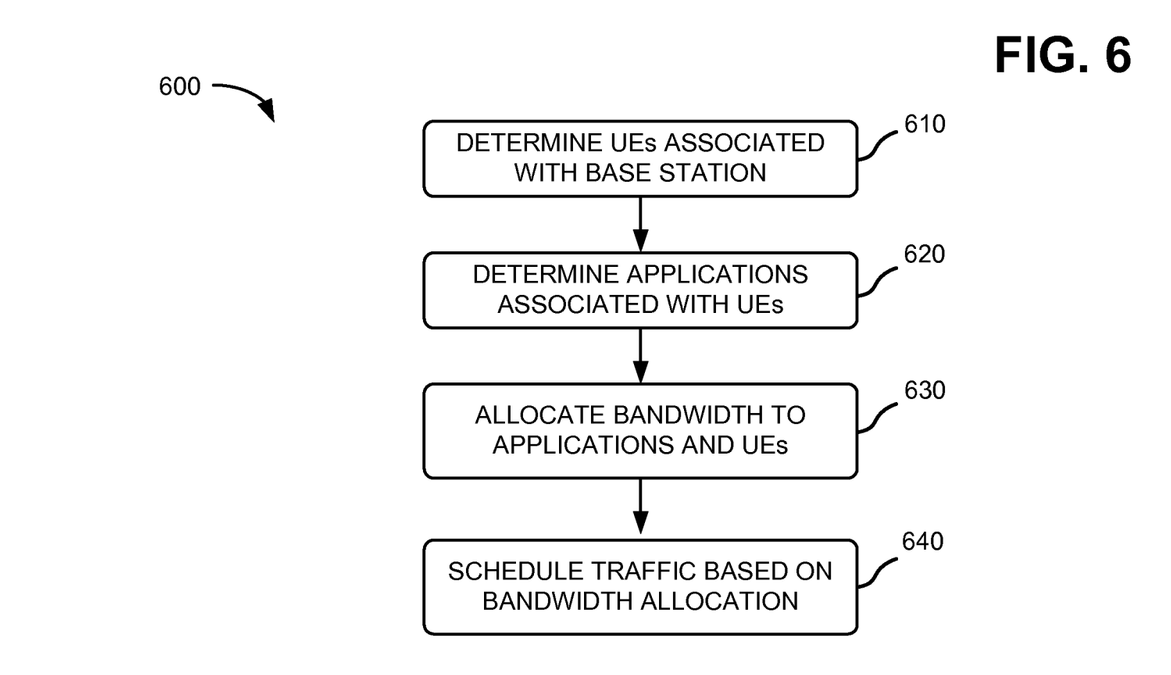
FIG. 6 is a flow chart of an exemplary process for allocating bandwidth based on applications in the network of FIG. 1.

FIG. 6 is a flow chart of an exemplary process 600 for allocating a bandwidth in a wireless network to several different applications. In one implementation, process 600 may be performed by scheduler 110. In another implementation, some or all of process 600 may be performed by another device or group of devices, including or excluding scheduler 110.

As illustrated in FIG. 6, process 600 may include determining UEs 150 associated with base station 120 (block 610). For example, scheduler 110 may identify UEs 150 based on connection requests or other communications, from UEs 150, that are received at base station 120. Scheduler 110 may also identify UEs 150 based on information stored by base station 120, such as records identifying prior transmission to/from UEs 150. Scheduler 110 may further identify UEs 150 based on data (e.g., a handover request) received from another base station 120 and/or communications received from core network 220 (e.g., an instruction to push data/instructions).

As shown in FIG. 6, process 600 may also include determining applications associated with the determined UEs 150 (block 620). For example, scheduler 110 may identify the applications based on data requests from UEs 150 and/or transmission between base station 120 and UEs 150. For example, data associated with a particular application may include a particular format and/or information identifying the application. Scheduler 110 may further identify the applications associated with UEs 150 based on records identifying, for example, applications provided by base station 120 and/or core network 220 to UEs 150. For example, scheduler 110 may identify applications previously purchased by a UE 150 and/or by other UEs associated with an associated subscriber.

Continuing with process 600, scheduler 110 may allocate total bandwidth 130 available from base station 120 to the determined applications (block 630). In one implementation, bandwidth may be allocated to the applications based on a predetermined algorithm, such as on a pro rata (percentage) basis. For example, if ten (10) applications are determined in block 620, scheduler 110 may allocate a tenth of total bandwidth 130 to each of the applications. In another implementation, a particular amount of bandwidth (e.g., 100 Mbs) or a particular fraction of total bandwidth 130 associated with base station 120 may be allocated to each application, regardless of the number of applications. Scheduler 110 may also allocate bandwidth available from base station 120 to the determined applications on a random basis.

In one implementation, the bandwidth allocation may be determined in block 630, for example, based on a user input. For example, scheduler 110 may provide a graphical user interface (GUI) or other type of interface to receive the user input, and the bandwidth may be allocated among the applications based on the input. For example, the input may identify an application and an amount of data (e.g., a number of Mbs) and/or a percentage of a total bandwidth 130 to allocate to the application. In another implementation, the user input may identify, for example, a ranking of the applications, and scheduler 110 may allocate portions of the total bandwidth based on the ranking. For example, a highest ranked application may receive a largest portion of total bandwidth 130. In one implementation, the allocated portion of total bandwidth 130 may be inversely proportional to the ranking so that a lower ranked application receives smaller portion of the total bandwidth than a higher ranked application.

The allocation may be determined in block 630 based on, for example, prior data transmissions associated with the applications. For, example, scheduler 110 may determine an amount of bandwidth to allocate to an application based on an amount of data associated with the application that is transmitted by a particular base station 120 during a prior time period. Scheduler 110 may also determine an amount of bandwidth to allocate to an application based on amounts of data associated with the application and transmitted by a particular base station 120 during multiple prior time periods. For example, the bandwidth allocated to an application may be determined based on an average amount, a mean amount, a maximum amount, a minimum amount, etc., of data associated with the application transmitted during two or more prior time periods.

Scheduler 110 may allocate bandwidth to an application in block 630 based on trends in previously transmitted amounts of associated data. For example, scheduler 110 may increase a bandwidth allocated to an application (e.g., more bandwidth is allocated to the application for a future time period) if increasing amounts of data were transmitted during prior time periods. Scheduler 110 may also perform a statistical analysis, such as a using Markov chain, to estimate a future amount of data associated with application based on amounts of data previously transmitted with respect to the application.

The allocation in block 630 may also be based on, for example, performance aspects associated with the determined applications. For example, higher bandwidths may be allocated to applications associated with transmissions of relatively large amounts of data (e.g., an application to stream multimedia content), whereas smaller amounts of bandwidths may be allocated to other applications associated with transmissions of relatively small amounts of data (e.g., an application that exchanges small messages). In another implementation, higher bandwidths may be allocated to applications that are less tolerant of data delays and/or losses. For example, applications associated with streaming multimedia data may receive relatively larger bandwidth allocations because delays and or loss of data may adversely influence playback of the streamed multimedia data by UEs 150.

When allocating total bandwidth 130, scheduler 110 may reserve a certain portion of total bandwidth 130. For example, scheduler 110 may reserve a portion (e.g., a tenth) of total bandwidth 130 to allocate to additional/new applications. For example, if scheduler 110 determines that a new application is being used by one of UEs 150, scheduler 110 may allocate some of the reserved bandwidth to this new application. In this way, scheduler 110 may adapt the bandwidth allocation to account for the new application.

Scheduler 110 may periodically (e.g., per second, per minute, hourly, daily, etc.) reallocate the bandwidth to the applications so that the allocation is adjusted for changes in UEs 150 and/or applications used by UEs 150 (e.g., removing bandwidth allocated to an application if the application is no longer used by the UEs 150). Scheduler 110 may also reallocate the bandwidths so the allocation is adjusted for changes in bandwidth use of applications by UEs 150 (e.g., allocating additional bandwidth to an application based on determining that the use of the application by UEs 150 is increasing or that the application is requiring additional amounts of data). In another implementation, scheduler 110 may reallocate the bandwidth to the applications based on another triggering event, such as detecting a particular number of transaction application, detecting a particular number of bandwidths associated with an application, receiving an indication of adding/removing applications from UEs 150, etc.

In one implementation, scheduler 110 may allocate bandwidth to individual applications in block 630, such that each application is associated with a separate amount of bandwidth. In another implementation, scheduler 110 may allocate bandwidth to groups or types of applications and/or application associated with particular types of data in block 630. For example, scheduler 110 may allocate an amount bandwidth to multimedia applications while another amount of bandwidth may be allocated to gaming applications.

In another embodiment, application bandwidths 140 may total to more than total bandwidth 130 since it is unlikely that all of the applications will be executed by UEs 150 at a time. In the example of FIG. 1, applications bandwidths 140 may total to n times total bandwidth 130, wherein n is a scaling factor that is greater than 1. If multiple application are executed by UEs 150 at same time, then scheduler 110 may reduce the application bandwidths 140 so that no more than total bandwidth 130 is used at a time. For example, scheduler 110 may reduce the application bandwidths 140 by reducing scaling factor n to be equal to 1 when UEs 150 request data associated with more than a threshold number of applications (e.g., a number of applications associated with more than total bandwidth 130).

In one implementation, the allocation of bandwidth to applications in block 630 may be further based on additional factors. For example, the allocation of bandwidth to the applications may be at least partially based on an allocation of the bandwidth among UEs 150.

Figure 7:
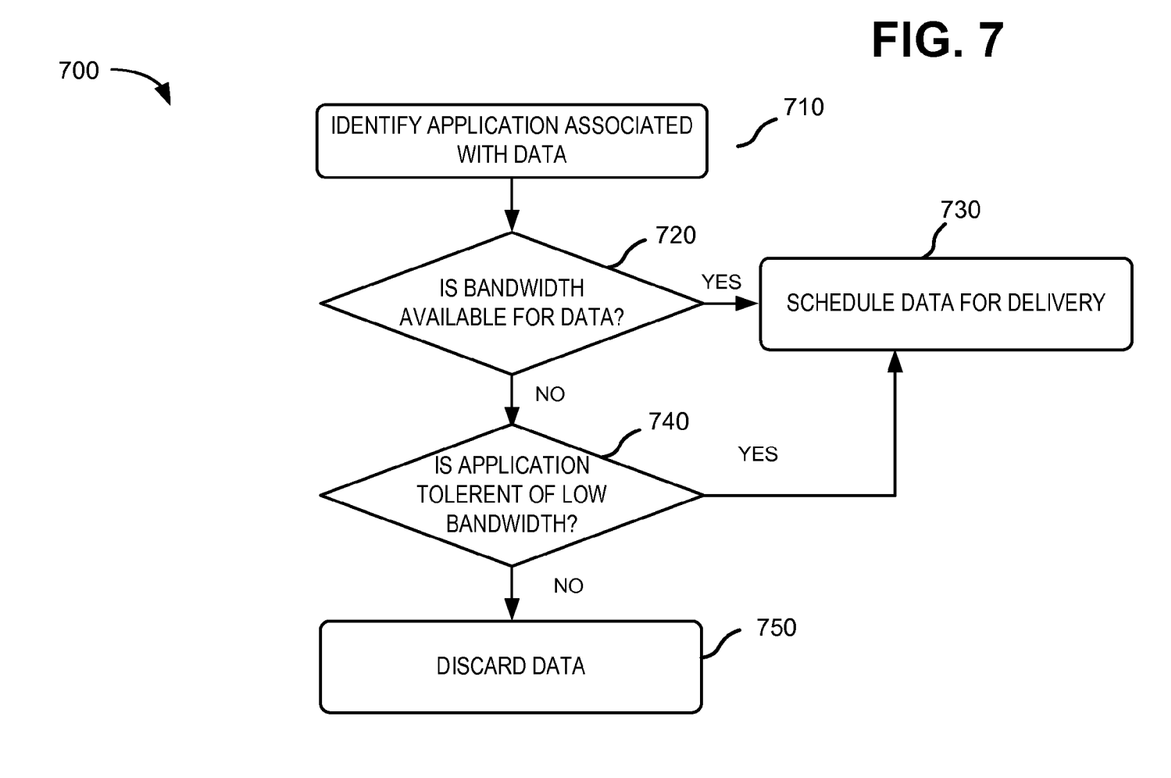
FIG. 7 is a flow chart of an exemplary process for handling data based on the application-based bandwidth allocation process of FIG. 6.
Figure 8:
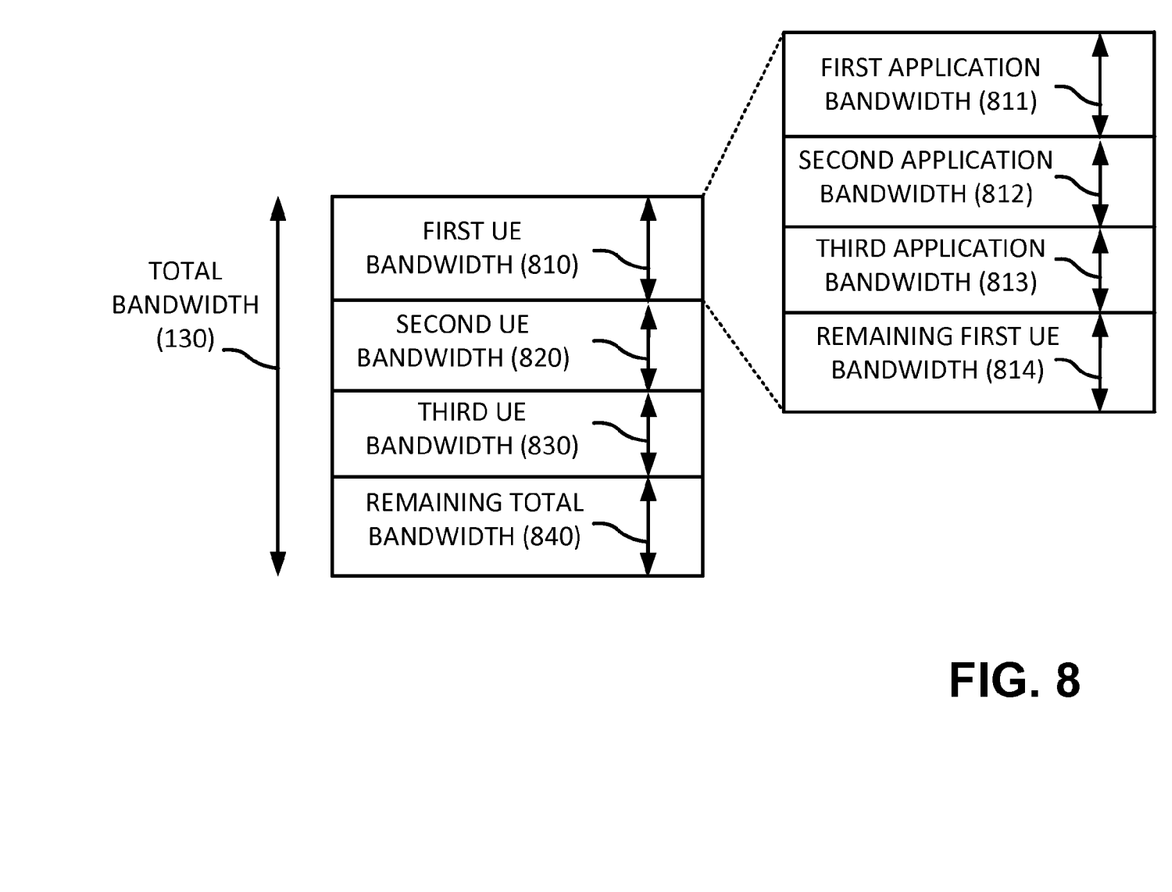
FIGS. 8 and 9 show exemplary bandwidth allocations in implementations described herein.

Turning now to FIG. 8, before discussing block 640 in connection with FIG. 7 below, FIG. 8 shows an exemplary bandwidth allocation in which total bandwidth 130 is allocated to different UEs 150. For example, FIG. 8 shows that total bandwidth 130 is allocated among four UEs (or groups of UEs) 150 as first UE bandwidth 810, second UE bandwidth 820, third UE bandwidth 830, and fourth UE bandwidth 840. First UE bandwidth 810 may represent a maximum possible bandwidth that is available to a first UE 150.

Different UEs (or groups of UEs) 150 may by associated with different UE bandwidths 810, 820, 830, and 840, based on, for example, different contractual agreements between a service provider and associated subscribers. Different bandwidths may also be allocated to different UEs 150 based on technical and/performance differences between UEs 150. For example, scheduler 110 may allocate more bandwidth to a device executing multiple applications, such as laptop computer, than to a mobile telephone with limited computing capabilities.

In one implementation, the UE bandwidths 810, 820, 830, and 840 may total to more than total bandwidth 130 since not all of UEs 150 may be receiving data from base station 120 concurrently. If transmitting data to UEs 150 based on UE bandwidths 810, 820, 830, and 840 would exceed total bandwidth 130, scheduler 110 may reduce UE bandwidths 810, 820, 830, and 840 as needed.

In one implementation, one of the UE bandwidths, such as fourth UE bandwidth 840, may correspond to a portion of total bandwidth 130 that is reserved (i.e., not allocated to UEs 150). For example, fourth UE bandwidth 840 may reserved for additional UEs 150, such as UEs 150 that connect to base station 120 after the allocation of total bandwidth 130 by scheduler 110. In another implementation, fourth UE bandwidth 840 may correspond to a catch-all group of UEs 150 (e.g., a group of UEs 150 that differ from UEs 150 associated with first UE bandwidth 810, second UE bandwidth 820, and third UE bandwidth 830).

As shown in FIG. 8, a bandwidth allocated to a particular UE (or group of UEs) 150 may be further divided among separate applications. For example, first UE bandwidth 810 may be further divided into first application bandwidth 811, second application bandwidth 812, third application bandwidth 813, and fourth application bandwidth 814. For example, scheduler 110 may determine that a first UE (associated with first UE bandwidth 810) executes four applications and may allocate portions of first UE bandwidth 810 among the four applications. Thus, scheduler 110 may allocate application bandwidths (e.g., application bandwidths 811-814) for different applications to associated with the different UEs 150.

Although FIG. 8 shows exemplary bandwidth allocation in which total bandwidth 130 is allocated to different UEs 150, in other implementations, scheduler 110 may allocate total bandwidth 130 based on fewer, different, and/or additional factors than those depicted in FIG. 8. Furthermore, it should be appreciated that although four UE bandwidths 810, 820, 830, and 840 and four application bandwidths 811-814 are shown in FIG. 8, more or fewer allocations may be used. For example, total bandwidth 130 may be divided among thousands of UEs 150 executing hundreds of applications.

Figure 9:
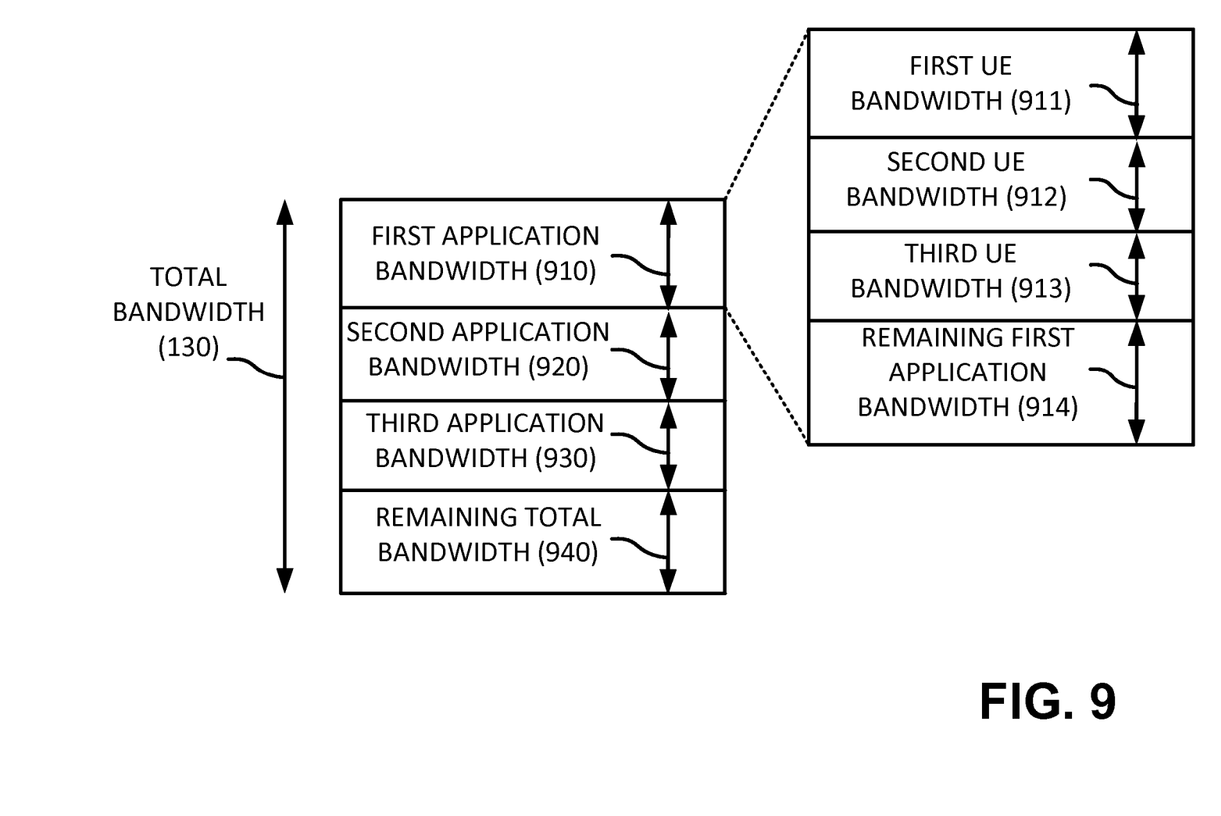

FIG. 9 shows an exemplary bandwidth allocation in which total bandwidth 130 is allocated to different applications. For example, FIG. 9 shows that total bandwidth 130 is allocated among four applications (or groups of applications) as first application bandwidth 910, second application bandwidth 920, third application bandwidth 930, and fourth application bandwidth 940. First application bandwidth 910 may represent, for example, a maximum bandwidth that is available for transmissions related to a first application. As previously described, application bandwidths 910, 920, 930, and 940 may total to more than total bandwidth 130. For example, application bandwidths 910, 920, 930, and 940 may be scaled by a scaling factor n.

Different applications (or groups of applications) may by associated with different application bandwidths 910, 920, 930, and 940, based on, for example, technical and/performance differences between the applications. For example, scheduler 110 may allocate more bandwidth to a data intensive application, such as multimedia streaming application.

In one implementation, one of the application bandwidths, such as fourth application bandwidth 940, may correspond to a portion of total bandwidth 130 that is reserved (i.e., not allocated to applications). For example, fourth application bandwidth 940 may be reserved for additional applications, such as an application that is released after the allocation of total bandwidth 130 among applications by scheduler 110. In another implementation, fourth application bandwidth 940 may correspond to a catch-all group of applications (e.g., a group of application that differ from applications associated with first application bandwidth 910, second application bandwidth 920, and third application bandwidth 930).

As shown in FIG. 9, a bandwidth allocated to a particular application (or group of applications) may be further divided among separate UEs 150. For example, first application bandwidth 910 may be further divided into first UE bandwidth 911, second UE bandwidth 912, third UE bandwidth 913, and fourth UE bandwidth 914. For example, scheduler 110 may determine that a first application (associated with first application bandwidth 910) is executed by four UEs 150 and may allocate portions of first application bandwidth 910 among the four UEs 150.

Although FIG. 9 shows exemplary bandwidth allocation in which total bandwidth 130 is allocated to different applications, in other implementations, scheduler 110 may allocate total bandwidth 130 based on fewer, different, and/or additional factors than those depicted in FIG. 9. Furthermore, it should be appreciated that although four application bandwidths 910, 920, 930, and 890 and four UE bandwidths 911, 912, 913, and 914 are shown in FIG. 9, more or fewer allocations may be used. For example, total bandwidth 130 may be divided among thousands of UEs 150 executing hundreds of applications.

Returning to process 600 in FIG. 6, scheduler 110 may schedule transmissions of traffic based on the bandwidth allocation of process block 630 (block 640). For example, scheduler 110 may identify data associated with an application and may limit transmissions associated with the identified data during periods of congestions based on an associated bandwidth.

FIG. 7 is a flow chart of an exemplary process 700 for scheduling transmission of traffic in block 640 based on a bandwidth allocated to an associated application. In one implementation, process 700 may be performed by scheduler 110. In another implementation, some or all of process 700 may be performed by another device or group of devices, including or excluding scheduler 110.

As illustrated in FIG. 7, process 700 may include identifying an application associated with the data to be transmitted (block 710). For example, scheduler 110 may identify an application associated with the data based on a format of the data. For example, a packet associated with a particular application may include a particularly formatted header and/or payload section. In addition and/or in the alternative, scheduler 110 may identify the application associated with the data based on data stored in a header of the data. For example, a packet may include a header field identifying the application. Scheduler 110 may also identify the application in block 710 based on an address associated with the data. For example, a particular application may be associated with an application server located at a particular network address, and scheduler 110 may determine that data originating from that particular network address is associated with the particular application.

Process 700 may further determine whether sufficient bandwidth is available for transmission of the data (block 720). For example, scheduler 110 may determine whether congestion is present in data transmissions from base station 120. For example, scheduler 110 may determine whether occupancy of queues 320 exceeds a threshold and/or whether there is any latency or delays associated with transmission of data from queues 320. If there is congestion, scheduler 110 may determine whether there is adequate bandwidth associated with the application identified in block 710 to transmit the data. For example, scheduler 110 may determine (1) the bandwidth associated with the application, (2) a used portion of the bandwidth (i.e., a portion of the application bandwidth already allocated to other transmissions), and (3) whether adequate remaining bandwidth is left over to handle delivery of the data from base station 120 to UE 150. For example, if 10 Mbs are allocated to an application and 6 Mbs of data associated with the application were previously transmitted, scheduler 110 may determine whether additional data associated with the application may be handled via the remaining 4 Mbs.

If sufficient bandwidth is available to handle the data (block 720-Yes), scheduler 110 may schedule the data for delivery from base station 120 (block 730). For example, scheduler 110 may schedule the data for delivery using the remaining available bandwidth (block 730).

If insufficient bandwidth is available to handle the data (block 720—No), scheduler 110 may determine whether the application is tolerant of transmission at a lower, remaining portion of the bandwidth allocated to the application (block 740). For example, if the data is associated with an application to present high-definition multimedia content, scheduler 110 may determine that a portion (i.e., less than all) of the media content may be transmitted based on a lower bandwidth to provide a standard-definition version of the multimedia content. Alternatively, scheduler 110 may determine that the application may operate acceptably at the lower bandwidth. For example, scheduler 110 may determine that an application to download content, although possibly delayed by lower bandwidth, may still provide adequate performance at a lower bandwidth. If the application is tolerant of transmission at the lower, remaining portion of the bandwidth allocated to the application (block 740-Yes), scheduler 110 may schedule the data for delivery using the remaining available bandwidth (block 730).

If the application is not tolerant of transmission at the lower, remaining portion of the bandwidth allocated to the application (block 740—No), scheduler 110 may discard the data (block 750). For example, the application may be intolerant of data transmission at a lower bandwidth if undesired jitter, delays, or other adverse effects on the operation of the application may result. Scheduler 110 may discard the data in block 750, for example, by allowing the data to time out while waiting for transmission from base station 120.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by a processor, user equipments (UEs) associated with a base station;
   determining, by the processor, applications associated with the UEs;
   allocating, by the processor, portions of a bandwidth associated with the base station to the applications, wherein allocating the portions of the bandwidth associated with the base station to the applications further includes:
      determining a weight factor for queues of traffic associated with each application by comparing a bandwidth allocated to each application to the bandwidth associated with the base station;
      applying the determined weight factor to the queues of traffic associated with each application; and
      allocating the portions of the bandwidth based on the applied weight factors; and
   scheduling, by the processor, transmission of data from the base station based on allocating the portions of the bandwidth to the applications, wherein scheduling the transmission of the data from the base station based on allocating the bandwidth to the applications includes:
      determining a particular application associated with the data;
      determining a particular bandwidth associated with the particular application;
      determining whether the data can be transmitted from the base station based on the particular bandwidth; and
      scheduling the data for delivery when the data can be transmitted from the base station based on the particular bandwidth.

2. The method of claim 1, wherein allocating the portions of the bandwidth to the applications includes:
   allocating a part of the bandwidth to a particular UE, of the UEs;

identifying one or more applications, of the applications, associated with the particular UE; and allocating the part of the bandwidth among the one or more applications.

3. The method of claim 1, wherein allocating the portions of the bandwidth to the applications includes:
allocating a part of the bandwidth to another application;
identifying one or more UEs, of the UEs, associated with the other application;
and allocating the part of the bandwidth among the one or more UEs.

4. The method of claim 1, wherein determining the particular application associated with the data include:
identifying a feature associated with the data, wherein the feature includes at least one of:
a format associated with the data,
an address associated with the data, or
a portion of the data; and
determining the particular application based on the feature associated with the data.

5. The method of claim 1, further comprising:
determining whether the particular application is tolerant of delivery using a reduced bandwidth; and
scheduling the data for delivery based on the reduced bandwidth when the particular application is tolerant of delivery using the reduced bandwidth.

6. The method of claim 1, wherein allocating the portions of the bandwidth associated with the base station to the applications further includes:
identifying one or more of the UEs executing another application;
identifying quality of service (QoS) data associated with the one or more UEs;
determining, based on the QoS data, a part of the bandwidth assigned to the one or more UEs; and
determining the portion of the bandwidth to be allocated to the other application based on the part of the bandwidth assigned to the one or more UEs.

7. The method of claim 1, wherein determining the applications associated with the UEs comprises:
determining the applications based on transmissions between the base station and the UEs.

8. A device comprising:
a memory configured to store one or more instructions; and
a processor configured to execute the one or more instructions to:
identify user equipments (UEs) associated with a base station,
determine a plurality of applications associated with the UEs,
allocate portions of a bandwidth associated with the base station to the plurality of applications, wherein the processor, when allocating the portions of the bandwidth associated with the base station to the plurality of applications, is further configured to:
determine a weight factor for queues of traffic associated with particular applications, of the plurality of applications, by comparing a bandwidth allocated to each particular application to the bandwidth associated with the base station;
apply the determined weight factor to the queues of traffic associated with each particular application, and
allocate the portions of the bandwidth based on the applied weight factors, and
schedule transmission of data from the base station based on allocating the bandwidth to the plurality of applications, wherein the processor, when scheduling the transmission of the data from the base station, is further configured to:
determine the particular application associated with the data,
determine a particular bandwidth associated with the particular application,
determine whether the data can be transmitted from the base station based on the particular bandwidth, and
schedule the data for delivery when the data can be transmitted from the base station based on the particular bandwidth.

9. The device of claim 8, wherein the processor, when allocating the portions of the bandwidth to the plurality of applications, is further configured to execute one or more instructions to:
allocate a part of the bandwidth to a particular UE, of the UEs,
identify one or more applications, of the plurality of applications, associated with the particular UE, and
allocate the part of the bandwidth among the plurality of applications.

10. The device of claim 8, wherein the processor, when allocating the portions of the bandwidth to the plurality of applications, is further configured to execute one or more instructions to:
allocate a particular part of the bandwidth to another particular application, of the plurality of applications,
identify one or more UEs, of the UEs, associated with the other particular application, and
allocate the particular part of the bandwidth among the one or more UEs.

11. The device of claim 8, wherein the processor, when determining the particular application associated with the data, is further configured to execute one or more instructions to:
identify a feature associated with the data, wherein the feature includes at least one of:
a format associated with the data,
an address associated with the data, or
a portion of the data, and
determine the particular application based on the feature associated with the data.

12. The device of claim 8, wherein the processor is further configured to execute one or more instructions to:
determine whether the particular application is tolerant of delivery using a reduced bandwidth,
schedule the data for delivery based on the reduced bandwidth when the particular application is tolerant of delivery using the reduced bandwidth, and
discard the data when the particular application is intolerant of delivery using the reduced bandwidth.

13. The device of claim 8, wherein the processor when scheduling the data for delivery when the data can be transmitted from the base station based on the particular bandwidth, is further configured to:
identify a time period when the base station does not have congestion, and
scheduling the data for delivery during the time period.

14. The device of claim 8, wherein the processor, when identifying the UEs associated with the base station, is further configured to:
identify, as the UEs, first UEs forwarding one or more connection requests to the base station and second UEs associated with one or more hand-over requests received by the base station from another base station.

15. A non-transitory computer-readable medium to store instructions, the instructions comprising:
one or more instructions that, when executed by a processor, cause the processor to be configured to:
identify user equipments (UEs) associated with a base station,
determine an application associated with the UEs,
allocate a portion of a bandwidth associated with the base station to the application, wherein the one or more instructions to allocate the portion of the bandwidth associated with the base station to the application further include:
one or more instructions that, when executed by the processor, further cause the processor to:
determine a weight factor for queues of traffic associated with the application by comparing a bandwidth allocated to the application to the bandwidth associated with the base station;
apply the determined weight factor to the queues of traffic associated with the application; and
allocate the portion of the bandwidth based on the applied weight factor, and
schedule transmission of data, associated with the application, based on allocating the portion of the bandwidth to the application, wherein the one or more instructions to schedule the transmission of the data from the base station further include:
one or more instructions that, when executed by the processor, further cause the processor to:
determine whether the data can be transmitted from the base station based on the bandwidth, and
schedule the data for delivery when the data can be transmitted from the base station based on the bandwidth.

16. The non-transitory computer-readable medium of claim 15, wherein the one or more instructions to allocate the portion of the bandwidth to the application further include:
one or more instructions that, when executed by the processor, further cause the processor to be configured to:
allocate a part of the bandwidth to a particular UE, of the UEs,
identify applications associated with the particular UE, wherein the applications include the application, and
allocate the part of the bandwidth among the applications.

17. The non-transitory computer-readable medium of claim 15, further comprising:
one or more instructions that, when executed by the processor, further cause the processor to be configured to:
allocate a particular part of the bandwidth to another application,
identify one or more UEs, of the UEs, associated with the other application, and
allocate the particular part of the bandwidth among the one or more UEs.

18. The non-transitory computer-readable medium of claim 15, wherein the instruction further include:
one or more instructions that, when executed by the processor, further cause the processor to be configured to:
determine whether the application is tolerant of delivery using a reduced bandwidth when the data cannot be transmitted from the base station based on the bandwidth,
schedule the data for delivery based on the reduced bandwidth when the application is tolerant of delivery using the reduced bandwidth.

19. The non-transitory computer-readable medium of claim 18, wherein the instruction further include:
one or more instructions that, when executed by the processor, further cause the processor to be configured to:
discard the data when the data cannot be transmitted from the base station based on the bandwidth and when the application is intolerant of delivery using the reduced bandwidth.

20. The non-transitory computer-readable medium of claim 15, wherein the one or more instructions that cause the processor to be configured to allocate the portion of the bandwidth associated with the base station to the application further include:
one or more instructions that, when executed by the processor, further cause the processor to be configured to:
receive, from the UEs, information identifying a ranking of the application among applications, and
allocate the portion of the bandwidth associated with the base station to the application based on the ranking of the applications.

* * * * *